United States Patent [19]

Morris

[11] 4,017,789
[45] Apr. 12, 1977

[54] SWITCHING REGULATOR WITH INSIDE LOOP CURRENT AND FOLDBACK REGULATOR AND OUTSIDE LOOP VOLTAGE DETECTION CIRCUIT

[75] Inventor: David Morris, Brooklyn, N.Y.

[73] Assignee: Litton Business Systems, Inc., Morris Plains, N.J.

[22] Filed: Apr. 16, 1975

[21] Appl. No.: 568,486

Related U.S. Application Data

[63] Continuation of Ser. No. 347,185, April 2, 1973, abandoned.

[52] U.S. Cl. .................................. 323/17; 323/9; 323/20; 323/DIG. 1
[51] Int. Cl.² ........................................ G05F 1/56
[58] Field of Search ............ 323/4, 9, 17, 20, 22 T, 323/DIG. 1

[56] References Cited

UNITED STATES PATENTS

| | | | |
|---|---|---|---|
| 2,497,794 | 2/1970 | Fredrickson et al. | 323/DIG. 1 |
| 3,284,692 | 11/1966 | Gautherin | 323/DIG. 1 |
| 3,629,622 | 12/1971 | Denenberg, Jr. | 323/20 |
| 3,754,182 | 8/1973 | Morris et al. | 323/17 |
| 3,781,653 | 12/1973 | Marini | 323/17 |

*Primary Examiner*—Gerald Goldberg
*Attorney, Agent, or Firm*—Stephen A. Roen; Norman Friedman; Robert F. Rotella

[57] ABSTRACT

A constant potential power supply with current overload protection having a series switching regulator including a series switching circuit controlled by both a Schmitt-trigger circuit controlled by an output voltage detector to maintain the output load voltage within a predetermined range during normal operation and a current overload protection circuit having a foldback characteristic which operates when the output current goes above a predetermined value. The Schmitt-trigger circuit is actuated by a signal from an output voltage detection circuit when the output load potential decreases below a certain value to enable the series switching circuit to conduct current to the load from an input voltage source and is disabled as the output load potential goes above a certain value. After actuation of the series switching circuit and until it is disabled, charging current passes into an integrating capacitor. This integrating capacitor, is coupled across the load, and discharges through it when the series switching circuit is cut-off. The current overload protection circuit, which senses the output load current, exclusively controls and enables and disables the series switching circuit of the regulator when the output current increases above a predetermined level. The particular arrangement between the series switching circuit and the current overload protection circuit is such that the current overload circuit is not within the output voltage detection loop thereby improving the overall regulation of the constant potential power supply and provides significant current overload protection thereto.

8 Claims, 6 Drawing Figures

SWITCHING REGULATOR WITH INSIDE LOOP CURRENT AND FOLDBACK REGULATOR AND OUTSIDE LOOP VOLTAGE DETECTION CIRCUIT

This is a continuation of application Ser. No. 347,185 filed Apr. 2, 1973 now abandoned.

BACKGROUND OF THE INVENTION

Overcurrent protection circuits for switching type voltage regulators have been developed but these have shortcomings which affect their usefulness. These switching regulators usually employ a circuit such as a Schmitt-trigger and an output voltage detection circuit which is utilized to detect the variation in the output load potential and in turn control a series connected electronic switch which selectively interconnects an unregulated direct current potential source to a potential integrator. Additionally the output current in such switching regulators is sensed in the output load circuit and the voltage drop caused by said sensing is also detected by the output voltage detection circuit. The constancy of output load potential provided is dependent upon the variation of the output load potential, accurate sensing of the output load voltage and the voltages at which the controlled series connected electronic switch is actuated into conduction and cut-off. The more accurate the sensing of the output load voltage, the more nearly constant is the output potential maintained. This accuracy is an important factor in obtaining good regulation and heretofore has been rather difficult to simply obtain.

SUMMARY OF THE INVENTION

It is, therefore, an object of this invention to provide an improved current overload protection circuit for a switching regulator circuit.

Another object of this invention is to provide an improved potential power supply having a current overload protection circuit which results in improved voltage regulation.

A further object of this invention is to provide an improved current overload protection circuit for a switching regulator circuit which achieves foldback operation in the current overload mode.

A still further object of this invention is to provide an improved constant potential power supply which will protect against overload current and increase the life of the battery used to provide the input voltage.

An additional object of this invention is to provide an improved current overload protection circuit for a switching regulator circuit which senses the current in a continuous mode regardless of the switching action of the regulator without deleteriously affecting its regulation.

A still additional object of this invention is to provide an improved current overload protection circuit having a foldback characteristic for a switching regulator which during current overload conditions operates in the switching mode while maintaining all the advantages of a switching regulator including minimum series pass transistor power loss, minimum heat dissipation, high system efficiency and small parts.

These and other objects of the present invention are accomplished in the illustrative embodiment by providing a constant potential power supply circuit which is fed by a battery supply voltage. The power supply circuit comprises a switching regulator including a switch which is controlled, under normal operation, by a Schmitt-trigger amplifier having two triggering stages and an output voltage detector. The output voltage detector is responsive to the output load voltage and provides a control signal to the Schmitt-trigger amplifier. A current overload circuit is connected between the series switch and the output voltage detector. Both the outputs of the Schmitt-trigger amplifier and the current overload circuit are connected to and control the series switch which initiates and terminates the regulator's power stroke. As the output voltage decreases to a certain predetermined minimum value the Schmitt-trigger amplifier is enabled causing its first triggering stage to switch ON thereby initiating the power stroke by switching ON the series switch. When the output voltage increases to a predetermined maximum value it is now sufficient to result in the first triggering stage being turned OFF thereby triggering the second stage to its ON condition and ending the power stroke by switching OFF the series switch. When the output voltage decreases below the minimum value the first triggering stage is switched back to its ON condition thereby triggering the second stage OFF resulting in the initiation of another power stroke. However when the output current increases above a certain predetermined value the current overload circuit is actuated which then exclusively controls the switching state of the series connected switch until such time as the load current returns to normal.

DESCRIPTION OF THE INVENTION

Figure 2:
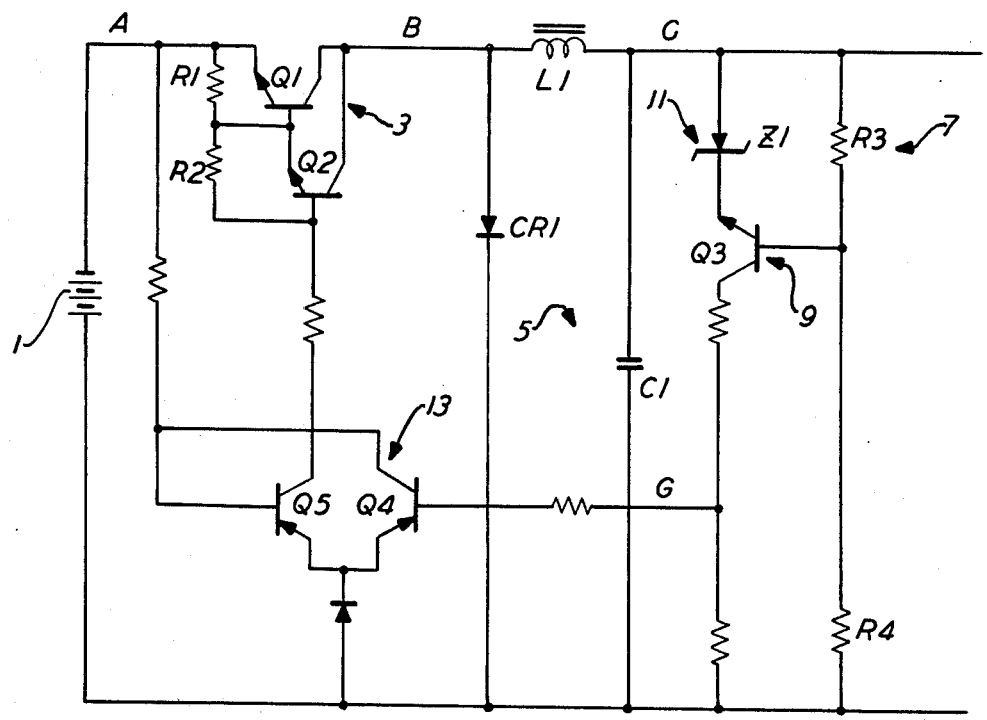
FIG. 2 is a schematic diagram of the circuit illustrated in the embodiment of FIG. 1.
Figure 1:
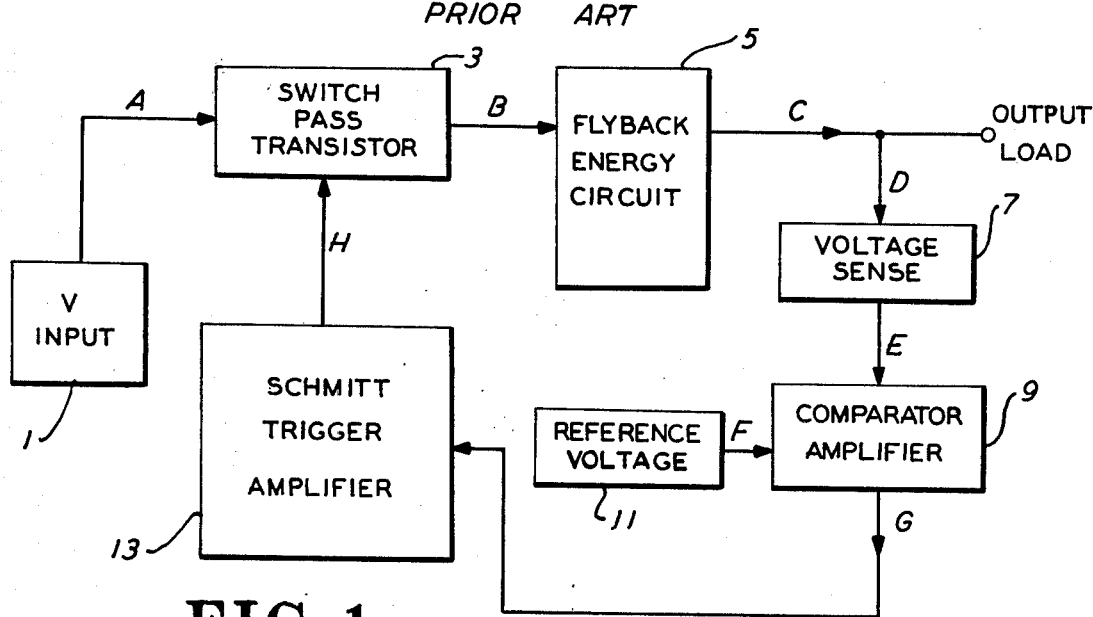
FIG. 1 is a simplified functional block diagram of a prior art circuit.
Figure 3:
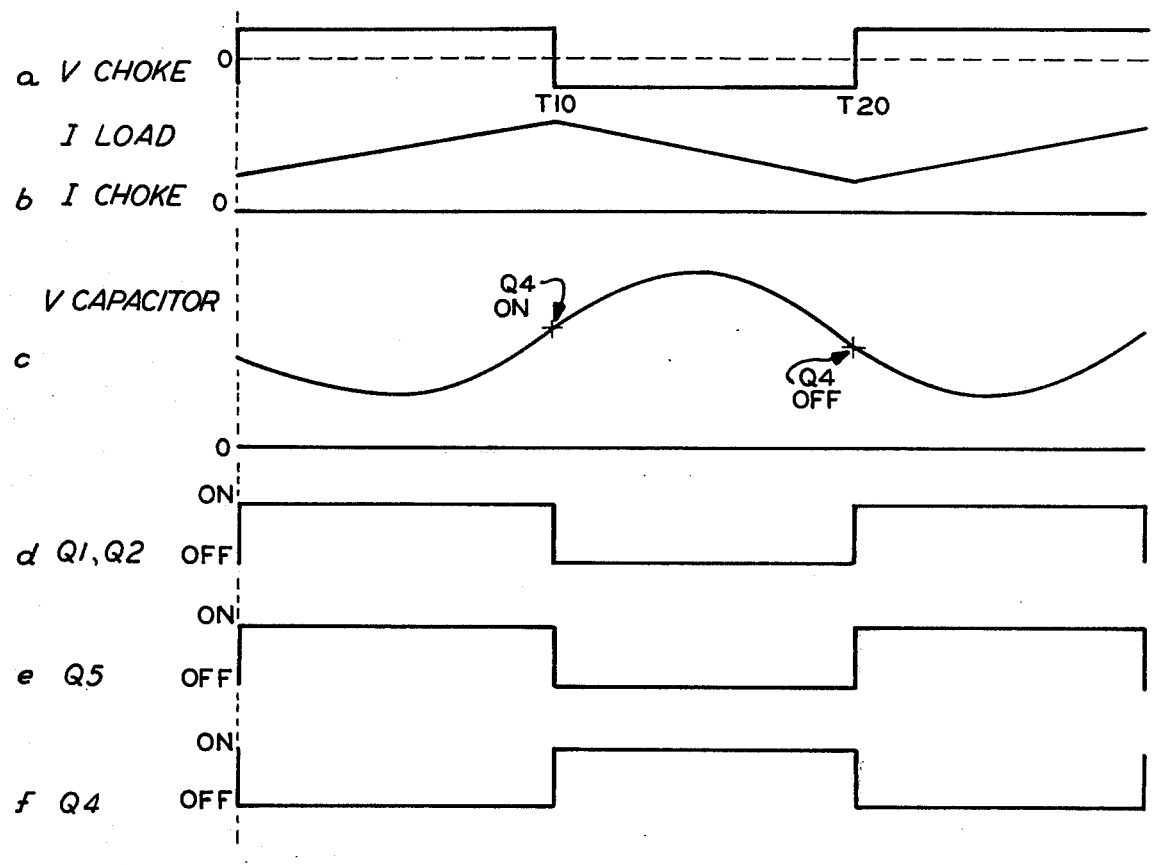
FIG. 3 is a series of waveforms useful in understanding the operation of the circuit illustrated in FIGS. 1 and 2.

In order to fully understand and appreciate the invention brief reference must be had to the prior art illustrated in FIGS. 1–3. Referring now specifically to FIG. 1, a DC input voltage source 1 is coupled over line A to a series switching pass transistor 3, the output of which is coupled over line B to a "flyback energy" circuit 5, described in detail infra. The output of such "flyback energy" circuit 5 is coupled over line C to an output load as well as to a voltage sensing circuit 7 over line D. The output of the voltage sensing circuit 7 is coupled over line E to a comparator amplifier 9 which in addition to its first input coupled over line E has a reference voltage source 11 coupled over line F to its second input. The output of comparator amplifier 9 is then coupled over line G to a Schmitt-trigger amplifier circuit 13 which comprises part of a first transmission means. This Schmitt-trigger amplifier circuit 13 is coupled over line H to a control input of the series switch pass transistor 3.

Referring now to FIG. 2, wherein the detailed schematic of the circuit illustrated in FIG. 1 is illustrated, a direct current voltage source 1 is coupled over line A to a series switch pass transistor circuit arrangement 3 comprising NPN transistors Q1 and Q2 in compound configuration with associated bias resistors R1 and R2. The outputs from the collectors of transistors Q1 and Q2 are coupled over line B to the "flyback energy" circuit comprising inductor L1, energy storage capacitor C1, and diode CR1. This "flyback energy" circuit is coupled over line C to the output load and to an output voltage detection circuit comprising a voltage sense element 7 including voltage sensing resistors R3 and R4, and comparator amplifier 9 including NPN transistor Q3, and reference voltage source 11, a zener diode Z1. An output signal is developed at the collector of transistor Q3 which is then coupled over line G to one of triggering sections of the Schmitt-trigger amplifier 13, comprising PNP transistors Q4 and Q5; these triggering sections, are alternately ON and OFF, and control the state of compound connected transistors Q1 and Q2.

Referring now to FIG. 1, the operation of said circuit will be briefly described. Assuming that the output load voltage has not yet decreased below the point at which series switching pass transistor circuit 3 is cut-off, direct current from the voltage source 1 will be coupled over line A through the conducting series switch pass transistor 3 into the "flyback energy" circuit 5 and then directly to the output load. The output voltage developed across the load is detected by the voltage detection circuit over line D through a voltage sensing circuit 7 and is compared with the fixed reference voltage of reference source 11 coupled over line F through the comparator amplifier circuit 9. When the voltage across the output load, which is sensed by the voltage sense circuit 7, increases beyond a certain point, an output signal is developed by comparator amplifier 9 of sufficient magnitude to operate Schmitt-trigger 13 in such a manner so as to provide a control signal at its output over line H to turn off series switching pass transistor circuit 3. Such series switching pass transistor 3 will be maintained in a non-conducting state until such time as the output voltage goes below a certain predetermined value at which time an output signal developed from the output voltage detection circuit is coupled over line G to switch the Schmitt-trigger amplifier 13 into its other state thereby providing a control signal over line H to the series switch pass transistor 3 which will turn it ON.

Referring now to the detailed schematic of the circuit illustrated in FIG. 2 and assuming that the output voltage has not reached a first predetermined maximum but is nevertheless sufficiently high to maintain the compound connected switch pass transistors Q1 and Q2 in the conductive state. During such time current from input voltage source 1 will flow over line A through compound connected transistors Q1 and Q2 to the "flyback energy" circuit comprising inductor L1, capacitor C1 and diode CR1, to charge up storage capacitor C1, as well as to pass through the output load and sensing resistors R3 and R4. When the output voltage reaches a first predetermined maximum value, a voltage is developed across resistor R3, which is slightly greater than the reference voltage established by zener diode Z1 in the emitter base circuit of NPN transistor Q3, thereby driving transistor Q3 further into conduction which results in transistor Q4 of the Schmitt-trigger amplifier 13 being driven into conduction and cutting-off the base-emitter drive for the series switching pass transistor Q1 and Q2. When the series switching pass transistors Q3 and Q4 are cut-off continuous current will be provided to the load via the operation of the "flyback energy" circuit since inductor L1 will then supply current through the free wheeling diode CR1 to the load and storage capacitor C1. When the inductive energy of L1 decreases to a certain point capacitor C1 will then take over and start to discharge through the load. The output voltage however, will continue to decrease. The series switch pass transistor Q1 and Q2 will still be maintained cut-off until such time as the output voltage decreases below a certain predetermined amount, resulting in the biasing of transistor Q3 OFF thereby driving transistor Q4 OFF which will in turn drive transistor Q5 ON to provide the series switching transistor Q1 and Q2 with base-emitter drive. Thus, these transistors Q1 and Q2 will be turned On initiating another power stroke. FIG. 3 illustrates in detail the waveforms associated with said circuit.

Figure 4:
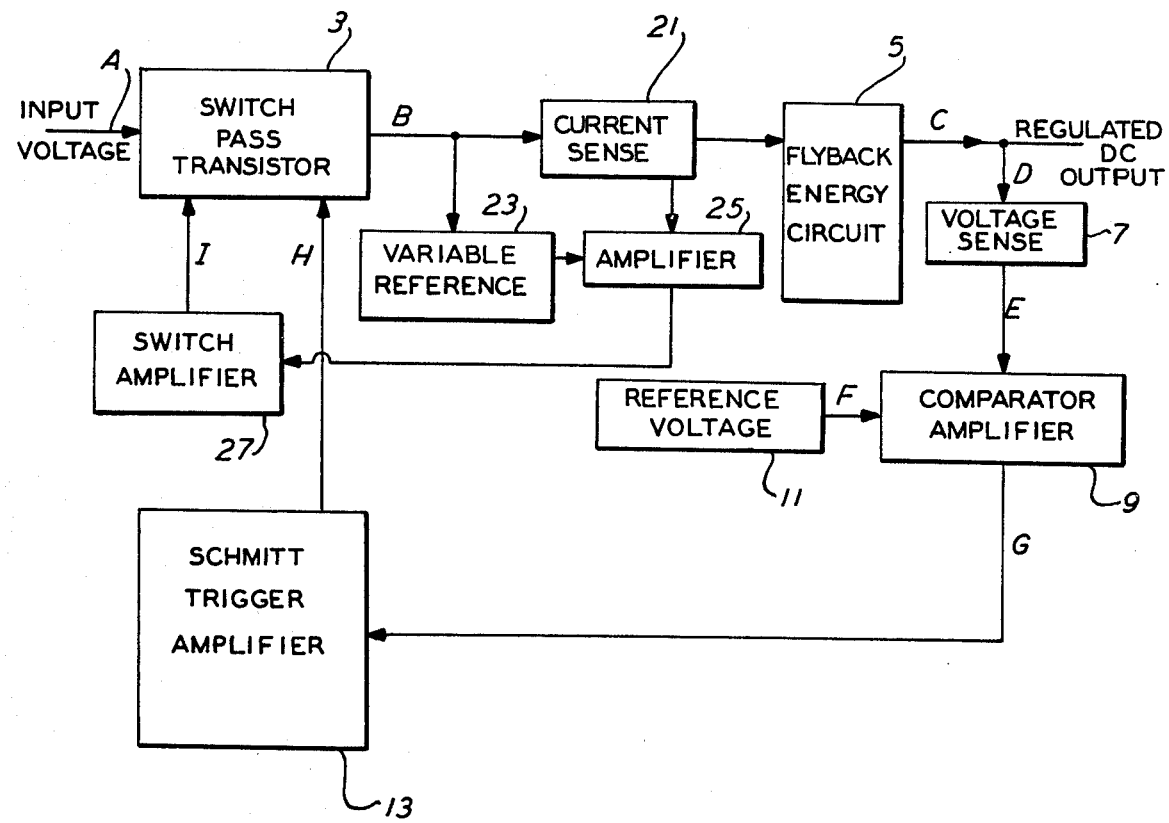
FIG. 4 is a simplified functional block diagram of a circuit incorporating the features of this invention.
Figure 6:
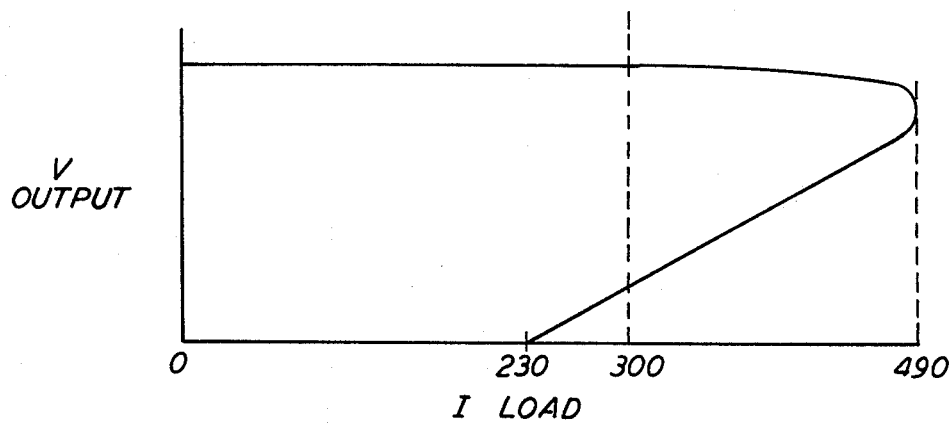
FIG. 6 is a graphic representation of the cut-off "foldback" characteristics of a power supply in accordance with the present invention.

Referring now to FIG. 4 wherein a simplified functional block diagram of the invention is illustrated. An input direct current voltage is coupled over line A to a switch pass transistor 3. This switch pass transistor has two control inputs H and I which are used to control the state of said switch pass transistor 3, it being driven into either a conducting or a non-conducting state on said control inputs. The output of this switch pass transistor 3 is coupled over line B to a current sensing element 21 as well as to a variable reference element 23. These two elements 21 and 23 are coupled to an amplifier 25 which provides an output signal to a switching amplifier 27, which comprises part of a second transmission means, the magnitude of which will depend on the value of the current sensed by current sensing element 21. If this current sensed is sufficiently large and greater than a predetermined value, a control signal will be coupled over line I, generated from the switching amplifier 27, to control the switch pass transistor 3. Current sensing element 21 and floating reference 23 together with amplifier 25 and switch amplifier 27 comprise what is referred to as a "foldback" circuit the characteristics of which are illustrated in FIG. 6; its function is to control the switch pass transistor 3 when the current flowing to the output load is greater than a predetermined value. The current passing through switch pass transistor 3 flows over line B through the current sense element 21 and the "flyback energy" circuit 5 and then to the output load. The output voltage across the load, as explained previously, is maintained by the output voltage detector; it is coupled over line D to the voltage sense element 7 whose output is coupled to one input of comparator amplifier 9. A reference voltage source 11 is coupled over line F to the comparator amplifier 9. When the output voltage across the load decreases below a certain predetermined value an output signal will be developed at the output of comparator amplifier 9 and will be coupled over line G to the Schmitt-trigger amplifier 13 which in turn controls the switch pass transistor 3 and in such a case will turn the switch pass transistor ON as explained previously. In the normal voltage regulation mode the Schmitt-trigger amplifier 13 will control the switching action, the state of the switching pass transistor 3. It will continuously continue to switch the switching pass transistor 3 ON and OFF to maintain a constant output voltage. However, when the output current increases past a certain predetermined point, switching control of this switch pass transistor 3 will be transferred exclusively to the foldback circuit which will then control the switching action of the regulator and therefore the output current so as to maintain it at or below said predetermined value.

Figure 5:
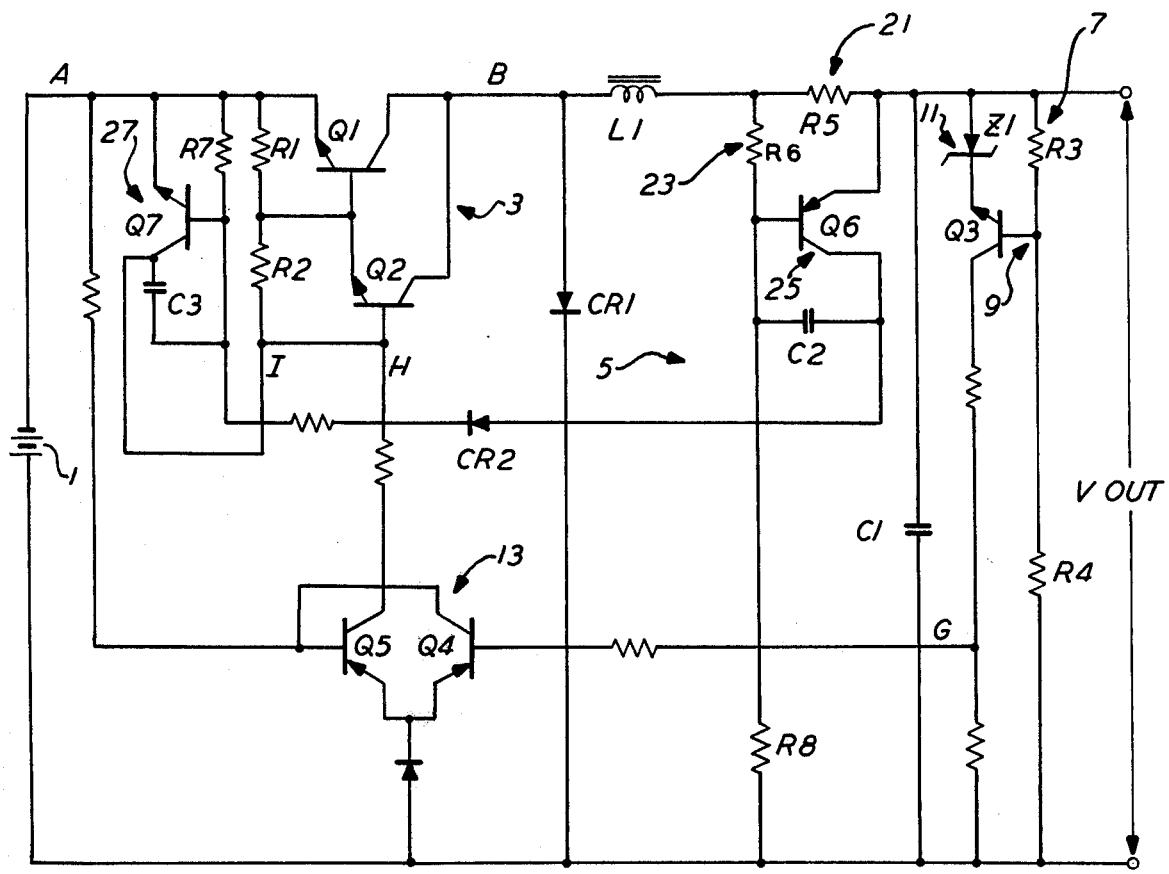
FIG. 5 is a schematic diagram of the invention illustrated in the embodiment of FIG. 4.

Referring now to the detailed schematic illustrated in FIG. 5, the switching voltage regulation portion of this circuit is similar to the circuit illustrated in FIG. 2. However, its main difference is in the manner in which the "foldback" circuit is utilized. One end of a current sensing resistor R5 is coupled to one end of inductor L1. The other end of current sensing resistor R5 is coupled to the emitter of NPN transistor Q6 as well as to one end of the output voltage detection circuit. Resistor R6, which operates as a variable reference potential, is coupled at one end to the current sensing resistor R5 and at its other end to the base of transistor Q6. A stablizing capacitor C2 is coupled from the collector of transistor Q6 to its base which base is also connected to resistor R8. These resistors R6 and R8 sample the output load voltage except as modified by the voltage drop across sensing resistor R5. The output from the collector of transistor Q6 is coupled through diode CR2, which is used to prevent any back voltage from being transmitted to the collector of Q6, to the switching amplifier 27 and in particular to the base of an NPN transistor Q7 and also to a biasing resistor R7 and stabilizing capacitor C3. The emitter and collector of transistor Q7 are coupled across the emitters and bases of both transistors Q1 and Q2. In the current overload mode when the output load current has increased above a predetermined value, the "foldback" circuit will come into operation to exclusively control the conduction state of the series switch pass transistors Q1 and Q2. The value of current at which this will occur will be determined by the particular values of the resistors R5 and R6 and the characteristic of transistor Q6. When the voltage developed across resistor R5 due to the current passing therethrough, which is substantially equal to the output load current, is greater than the voltage developed across resistor R6 and the base-emitter voltage of transistor Q6 it will bias transistor Q6 into conduction. The circuit of transistor Q6 will then act as an amplifier to provide an output signal sufficient to drive NPN transistor Q7 ON to thereby control the conduction of compound connected series transistors Q1 and Q2 by reducing the base-emitter voltage of said transistors thus turning them OFF and thereby causing the output load voltage to decrease. It should be noticed that since bias resistor R6 is effectively sampling the output load voltage at all times its voltage will also decrease as the output voltage and output current is decreased. Eventually a stable point in the output voltage is reached which point will be maintained by the switching action of the switching regulator controlled by the foldback circuit. The voltage across R6 therefore functions to provide a variable or floating reference voltage for transistor Q6, whose magnitude becomes smaller as the output voltage which it is responsive to decreases. It can be seen that as the voltage across resistor R6 becomes smaller this results in an increased bias voltage across transistor Q6 which results in greater decay in the output voltage and another stable point is reached but with a smaller load current. Since during the current overload mode the output voltage will be less than a certain predetermined value transistor Q4 will be switched off and transistor Q5 will remain ON; however, as previously described, transistor Q7 will control the state of series transistors Q1 and Q2 by turning them OFF at the appropriate time. Upon removal of a partial short or complete short, the power supply will revert back to its normal voltage regulating mode.

Obviously many modifications and variations of the present invention are possible in light of the above teachings. It is therefore, to be understood that within the scope of the appended claims the invention may be practiced otherwise than as specifically described.

What is claimed is:
1. A switching regulator for supplying energy to an output load comprising;
   first coupling means for coupling a direct current input voltage source;
   a series switching means, coupled to said first coupling means, having a first control terminal;
   second coupling means for coupling said output load to said series switching means;
   first control means, coupled to said second coupling means, for providing a first control signal which is a function of the output voltage;
   first transmission means, coupled to said first control means, for separately coupling said first control signal to said first control terminal of said series switching means;
   a current foldback control means for limiting the maximum output load current to a preset value and significantly decreasing the load current from said preset value as the load resistance is decreased, coupled between said series switching means and said first control means, for providing a second control signal which is a function of the output load current; and
   second transmission means, coupled to said said first coupling means and coupled to said current foldback means, for separately coupling said second control signal to said first control terminal.
2. The invention as in claim 1 further including energy storage means coupled across said output load.
3. The invention as in claim 2 wherein said energy storage means is directly coupled across said output load.
4. The invention as in claim 2 wherein said energy storage means is directly coupled across said first control means.
5. The invention as in claim 2 wherein said current foldback control means is connected in series with said series switching means and between said series switching means and said energy storage means.
6. The device as in claim 1 further including flyback energy circuit means which includes said energy storage means and wherein said current foldback control means is connected.
7. The invention as in claim 6 wherein said flyback energy circuit means further includes,
   inductive means, together with said current foldback control means, are coupled between said energy storage means and said series switching means.
8. The device as in claim 7 wherein said flyback energy circuit means further includes unidirectional current conducting means, for coupling said inductive means to said energy storage means.

* * * * *

UNITED STATES PATENT AND TRADEMARK OFFICE
CERTIFICATE OF CORRECTION

PATENT NO. : 4,017,789
DATED : April 12, 1977
INVENTOR(S) : David Morris

It is certified that error appears in the above-identified patent and that said Letters Patent are hereby corrected as shown below:

Column 4, line 8, after "pass" change "transistor" to --transistors--;

line 15, after "turned" change "On" to --ON--.

Change the title from "SWITCHING REGULATOR WITH INSIDE LOOP CURRENT AND FOLDBACK REGULATOR AND OUTSIDE LOOP VOLTAGE DETECTION CIRCUIT" to --CURRENT OVERLOAD PROTECTION CIRCUIT--.

Signed and Sealed this twenty-third Day of August 1977

[SEAL]

Attest:

RUTH C. MASON
Attesting Officer

C. MARSHALL DANN
Commissioner of Patents and Trademarks